United States Patent
Meyer-Rössler et al.

(10) Patent No.: US 12,361,364 B2
(45) Date of Patent: Jul. 15, 2025

(54) METHOD FOR SENSING THE POSITION OF A MOBILE, EXCHANGEABLE LOAD CARRIER WHICH CAN BE TRANSPORTED VIA A UTILITY VEHICLE

(71) Applicant: ZF CV Systems Global GmbH, Bern (CH)

(72) Inventors: Philip Meyer-Rössler, Giesen (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 351 days.

(21) Appl. No.: 17/934,696

(22) Filed: Sep. 23, 2022

(65) Prior Publication Data
US 2023/0021087 A1    Jan. 19, 2023

Related U.S. Application Data

(63) Continuation of application No. PCT/EP2021/057173, filed on Mar. 22, 2021.

(30) Foreign Application Priority Data

Mar. 23, 2020    (DE) .................... 10 2020 107 934.6

(51) Int. Cl.
| | |
|---|---|
| G06Q 10/08 | (2024.01) |
| G07C 5/02 | (2006.01) |
| H04W 84/12 | (2009.01) |

(52) U.S. Cl.
CPC ............... *G06Q 10/08* (2013.01); *G07C 5/02* (2013.01); *H04W 84/12* (2013.01)

(58) Field of Classification Search
CPC .......... G06Q 10/08; G07C 5/02; H04W 84/12
See application file for complete search history.

(56) References Cited

U.S. PATENT DOCUMENTS

| | | |
|---|---|---|
| 6,921,100 B2 | 7/2005 | Mantini et al. |
| 9,631,969 B1 | 4/2017 | Whalen |
| (Continued) | | |

FOREIGN PATENT DOCUMENTS

| | | |
|---|---|---|
| WO | 2007/095088 A2 | 8/2007 |

OTHER PUBLICATIONS

International Search Report of the European Patent Office dated May 25, 2021 for international application PCT/EP2021/057173 on which this application is based.

(Continued)

*Primary Examiner* — Vivek D Koppikar
*Assistant Examiner* — Jeffrey R Chalhoub
(74) *Attorney, Agent, or Firm* — Walter Ottesen, P.A.

(57) ABSTRACT

A method is for detecting the position of at least one mobile, interchangeable load carrier that is movable by a commercial vehicle, in a delimited detection area, in particular a depot, in which the at least one mobile, interchangeable load carrier is moved by vehicles. Accommodation operations and/or offloading events of the mobile, interchangeable load carrier in the detection area are determined by the vehicle as notification events, position data for identifying the position in the detection area are determined for the notification events, and position notification signals are formed by the commercial vehicle from the determined notification events and from the position data, and are transmitted to a communication center of the detection area via a wireless network. In the communication center, the current position data of the load carrier are determined from the received position notification signals and are stored in a memory and continuously updated.

23 Claims, 5 Drawing Sheets

(56) References Cited

U.S. PATENT DOCUMENTS

| | | | |
|---|---|---|---|
| 2006/0202817 A1* | 9/2006 | Mackenzie | G06Q 10/08 |
| | | | 340/568.1 |
| 2007/0181350 A1 | 8/2007 | Kranz et al. | |
| 2009/0088924 A1* | 4/2009 | Coffee | B28C 5/422 |
| | | | 701/31.4 |
| 2015/0349977 A1* | 12/2015 | Risse | H04L 12/6418 |
| | | | 375/257 |
| 2017/0254694 A1 | 9/2017 | Toigo | |

OTHER PUBLICATIONS

English Translation of the Written Opinion of the International Searching Authority dated May 25, 2021 for international application PCT/EP2021/057173 on which this application is based.

* cited by examiner

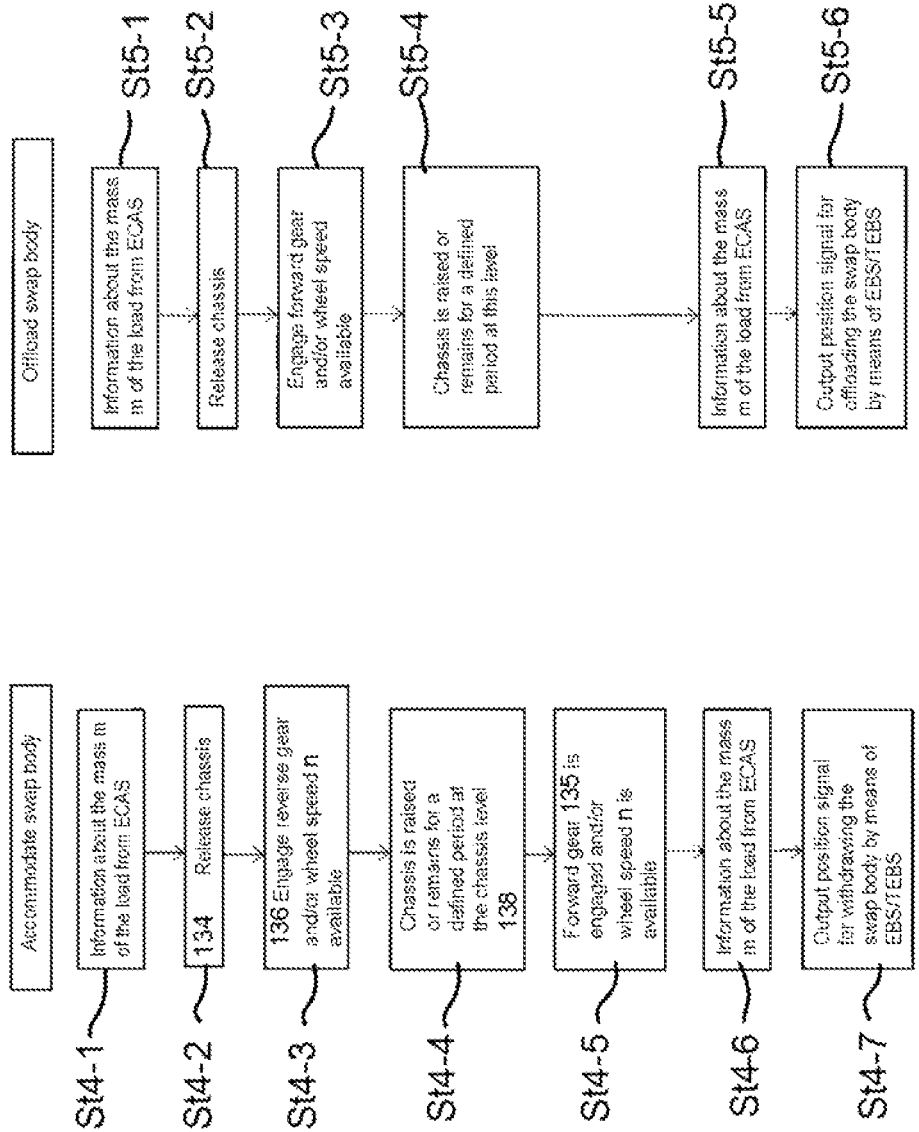

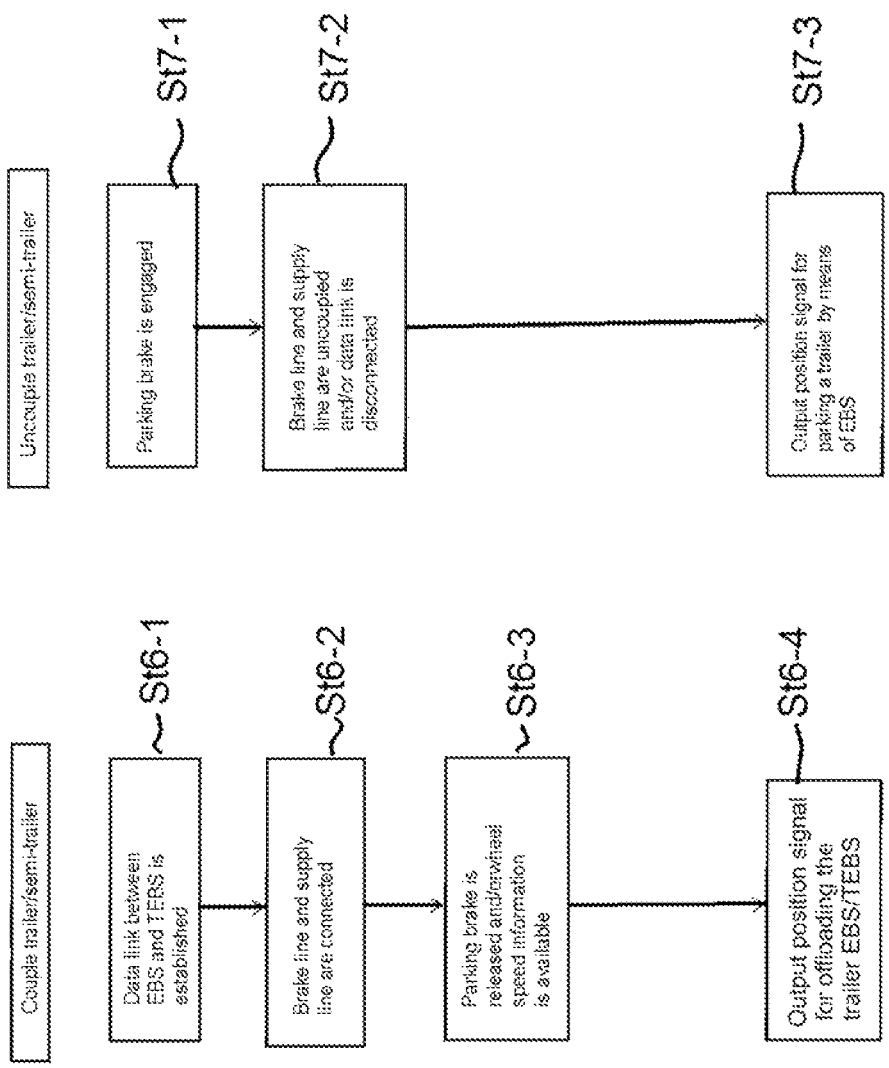

METHOD FOR SENSING THE POSITION OF A MOBILE, EXCHANGEABLE LOAD CARRIER WHICH CAN BE TRANSPORTED VIA A UTILITY VEHICLE

CROSS REFERENCE TO RELATED APPLICATIONS

This application is a continuation application of international patent application. PCT/EP2021/057173, filed Mar. 22, 2021 designating the United States and claiming priority from German application 10 2020 107 934.6, filed Mar. 23, 2020, and the entire content of both applications is incorporated herein by reference.

TECHNICAL FIELD

The present disclosure relates to a method for detecting the position of a mobile, interchangeable load carrier that is transportable by a commercial vehicle, and to a fleet management system for carrying out such a method.

BACKGROUND

A large number of different trailers, semi-trailers, swap bodies, and transshipment containers that are used to transport goods are generally parked temporarily at depots, in particular those of logistics companies or forwarding agents. Such trailers, that is, in particular drawbar trailers and semi-trailers, as well as swap bodies (swap containers) for accommodation on a commercial vehicle, and transshipment containers, in particular construction waste containers or overseas containers in accordance with the relevant standard for overseas containers, are hereinafter referred to as mobile, interchangeable load carriers that are transportable or movable by a commercial vehicle, Here, swap bodies and transshipment containers (construction waste containers, overseas containers) are accommodated directly on a suitable commercial vehicle; for this purpose, a corresponding commercial vehicle drives beneath a raised swap body, which is subsequently accommodated by the commercial vehicle by raising its chassis. A transshipment container is generally placed on a suitable commercial vehicle by a crane or another lifting device. Drawbar trailers and semi-trailers are hitched directly to suitable towing vehicles and constitute separate trailer vehicles that also generally have their own trailer braking system.

At a depot, the various load carriers are generally offloaded or temporarily parked at suitable or currently available offloading points. If a large number of goods are handled at the depot and for example the various load carriers are preloaded and temporarily parked in order to shorten the subsequent waiting times, in particular loading and unloading times, for the drivers, it can be time-consuming to relocate the respective load carrier at the depot. Relocating the load carriers can result in confusing situations and can be time-consuming for the driver. Relocating the load carriers can also be time-consuming for maintenance and administration. Particularly in confined spaces, problems can also arise if load carriers are unloaded in inaccessible places, so that for example access to load carriers parked first is impeded or impaired by subsequent load carriers. This may require subsequent changeover operations to make the respective load carriers accessible again.

For this purpose, it is known to equip load carriers with GNSS (Global Navigation Satellite System, for example GPS) transmitting devices, that is, each including a GNSS receiver for receiving GNSS satellite signals, as well as transmitting devices for transmitting corresponding unique identification signals. However, such equipment for the load carriers is generally expensive and requires an additional power supply. In addition, attaching the equipment to some load carriers can be problematic.

Furthermore, notification systems are known in which the driver is supposed to emit a position notification signal when accommodating and offloading a load carrier, so that the position of the parked load carrier is stored in a fleet management system. However, such a system can work reliably only if the coupling and uncoupling or the offloading operation or accommodation operation is also reliably reported by the driver; in some cases, however, in particular combinations, of a commercial vehicle and a trailer vehicle are temporarily parked at one position at the depot in order to move them subsequently to another final position without the driver reporting this as a new position, wherein the trailer vehicles subsequently remain at this position.

SUMMARY

It is an object of the disclosure to provide a method for detecting the position of a mobile, interchangeable load carrier that is movable or transportable by a commercial vehicle, the method enabling reliable position detection with relatively little effort. Furthermore, a fleet management system is to be provided for carrying out such a method, that is, in particular a fleet management system is to be enabled and/or extended for this purpose.

This object can, for example, be achieved by a method for detecting a position of a mobile, interchangeable load carrier that is movable by a commercial vehicle in a delimited detection area in which the mobile, interchangeable load carrier is moved by the commercial vehicle, the method including: determining, by the commercial vehicle, at least one of an accommodation operation and an offloading operation of the at least one mobile, interchangeable load carrier in the detection area as a notification event; determining, by the commercial vehicle, position data for identifying the position of the notification event in the detection area; forming, by the commercial vehicle, a position notification signal from the determined notification event and the determined position data; transmitting the position notification signal to a communication center via a wireless network; and, determining, in the communication center, current position data of the mobile, interchangeable load carrier from the position notification signal, wherein the current position data is stored in a data memory and continuously updated.

In this way, offloading operations and accommodation operations are recorded as notification events by the commercial vehicle. Offloading operations include in particular the uncoupling of a trailer (drawbar trailer, semi-trailer) and the offloading of a transshipment container or the dismounting of a swap body, and correspondingly, the coupling of a trailer vehicle, the mounting of swap bodies, and the accommodation of a transshipment container are recorded as accommodation operations.

An offloading operation or accommodation operation can be performed in particular by using defined or specified technical coupling means provided for this purpose, that is, for example a kingpin on the tractor and fifth wheel on the semitrailer, or a yellow and red coupling head and/or a standardized electronic connection, for example a CAN between the towing vehicle and trailer vehicle, or for example the accommodation of an ISO container or bulk container on the loading area in container accommodations, or the standardized accommodation of a swap body in a swap body accommodation.

The detection of an offloading operation or accommodation operation can also be carried out in particular by comparing measured values with predetermined characteristic curves or table values or loading/offloading characteristics, wherein, if applicable, a difference between the measured values and the table values or loading/offloading characteristics can also be formed for this purpose, and the difference can be compared with threshold values for this purpose, so that an offloading operation or accommodation operation can thereby be positively determined.

A commercial vehicle is basically any vehicle, that is, with active drive or passive drive, far example a trailer vehicle, that correspondingly enables the accommodation of a load carrier, that is, basically:

a truck for directly accommodating a load carrier on its loading area, a truck for accommodating a swap body, as well as a truck acting as a towing vehicle for accommodating a trailer vehicle, that is, in particular a semi-trailer tractor unit or a drawbar tractor, as well as for example a tractor or other vehicle suitable for accommodating a load carrier. Thus, in principle, a passenger car that accommodates a trailer via a drawbar or trailer coupling can also be a commercial vehicle in this function.

In principle, according to an embodiment, the commercial vehicle can also be a trailer vehicle that thus accommodates a load carrier and is not actively driven, but is towed by a towing vehicle.

The mobile, interchangeable load carrier is preferably selected from the following groups:

swap bodies for accommodation on the commercial vehicle;

semi-trailers to be accommodated by, that is, attached to, a commercial vehicle configured as a semi-trailer tractor unit;

drawbar trailers and turntable drawbar trailers for attachment to a commercial vehicle configured as a drawbar towing vehicle;

containers, in particular ISO containers or overseas containers or waste containers, to be accommodated by a container vehicle configured as a commercial vehicle.

The commercial vehicle forms a position notification signal from the determined notification event and current position data, which it can currently determine in particular from a global positioning system (GLASS), that is, for example GPS as well as Galileo, GLONASS, Beidu, and transmits this signal to a communication center of the fleet management system, which stores and updates the current position data of the respective load carriers in a continuously updated memory unit.

It is therefore no longer necessary for the driver to actively output and transmit a corresponding notification signal after the offloading operation or accommodation operation. Rather, an automated, self-actuating detection of a notification event is achieved, which is transmitted in an automated or self-actuating manner, in order to store the current position data of the various load carriers.

A significant improvement in logistics is thereby achieved with little effort, while updating the respective position data. In particular, an existing wireless network, such as a yard WLAN of a business, can be used, wherein the towing vehicles or commercial vehicles are generally equipped with corresponding wireless transceiver devices for this purpose.

In principle, a WLAN of the business can be used as wireless data transmission. According to a further embodiment, as an alternative to this, or if the WLAN or access to the WLAN should be absent, the transmission of the position data, for example via a mobile radio network, can also be used.

The detection of the notification events and formation of the position notification signals is carried out via the commercial vehicle or towing vehicle, which generally already has a GNSS in its navigation system and can therefore instantaneously determine the position data without additional effort. Here, on the one hand, the commercial vehicle can determine the notification event from its own information signals, in particular from information from its pneumatic air suspension system, in particular an electronic ECAS system. Determining the notification events in this way is particularly advantageous in the case of swap bodies and transshipment containers, since here, the load carrier is accommodated by the commercial vehicle as an additional mass and thus results in a change in state in the commercial vehicle, that is, in particular a change in level or change in lifting height when the corresponding mass is accommodated, and furthermore also a change in air pressure in the air suspensions of the level control system. Such measurement signals are generally already available in electronically controlled air suspension systems; thus, no further sensor system is required for this. Thus, the determination of a notification event can be carried out in the EBS of the commercial vehicle, which may additionally use signals from the ECAS system for this purpose.

For swap bodies in particular, in addition to the signals from the ECAS, vehicle dynamics signals such as the determination of a forward drive and reverse drive or the standstill of the vehicle, as well as the application of the parking brake, can also be determined and used to detect a notification event.

The offloading operation and the accommodation operation of transshipment containers, that is, in particular construction waste containers and overseas containers, can be carried out in the same way as for swap bodies. In particular the pressure change in the chassis, that is, in particular in pneumatic air suspensions, can be determined. If the air pressure drops or the air pressure of the various axles changes, an offloading operation, for example of a construction waste container or overseas container, can be detected, which can be associated with an unloading operation. If the air pressure increases, this indicates that the container has been loaded. In particular, these evaluations can also be carried out over predetermined measurement periods A, since an accommodation operation and an offloading operation of such a transshipment container are carried out via a time-limited operation, in particular to prevent false detection of other events.

It is advantageous here to use the EBS of the commercial vehicle instead of the TEBS of the trailer vehicle, since signals from the TEBS may not be transferred correctly if the power supply is insufficient when the trailer is switched off.

Here, a swap body trailer can be used, which, like a swap body vehicle, can raise and lower the platform in order to load and offload the swap body. This is preferably controlled by the TEBS or TEBS control unit. Thus, when loading and offloading the swap body with such a trailer, the data link exists.

The method according to the present disclosure can be carried out both in the towing vehicle and in the trailer. If the trailer is equipped with its own telematics, it can send its position signal autonomously in the absence of telematics in the towing vehicle.

Furthermore, a swap body may be provided on the towing vehicle, and a swap body may be provided on the trailer. Here, the EBS can enter into communication with the TEBS and determine which swap bodies have been offloaded. Alternatively, it may be provided that the swap body trailer transmits and determines this information independently via its own telematics.

During the offloading operation and accommodation operation of trailer vehicles, that is, the coupling and uncoupling of drawbar trailers including turntable trailers, and of semi-trailers and possibly other vehicles having their own brake system, data from the trailer electronic braking system (TEBS) can be used in addition, in particular the engagement and disengagement of a parking brake. Furthermore, the data link between the trailer vehicle and the towing vehicle, that is, the coupling of the TEBS to the EBS via a data interface, for example CAN bus, can also be used in addition. The pneumatic coupling, that is, the connection of the trailer to the red coupling head of the supply line of the towing vehicle and to the yellow coupling head of the service brake line (pneumatic brake control pressure) can also be used here to reliably determine the establishment of a pneumatic connection or the termination of the pneumatic connection.

Vehicle movements of the commercial vehicle can additionally be used for all offloading operations and accommodation operations of the various load carriers. In this case, transmission information and wheel speed information can be determined, for example the engagement of a corresponding gear, since for example a swap body cannot be loaded from the front. In this way, different uncoupling and accommodation operations can also be detected via the time sequence of the different driving directions of the commercial vehicle.

When offloading and accommodating a swap body, the lowering and raising of the vehicle's chassis, together with changes in the mass that can be determined from the pneumatic ECAS system, can be used so that such offloading operations and accommodation operations of a swap body can be clearly identified.

Thus, the accommodation operation and offloading operation can be detected via the respective commercial vehicle. These operations can also be transmitted in a further differentiated manner, for example also for bulk material as quantitatively specified offloading operations and accommodation operations. If for example concrete or other construction material is unloaded as bulk material at different offloading points, the mass changes can be associated with the position data so that the fleet management system stores which quantities of the bulk material were offloaded at different position data.

Furthermore, the loading and unloading of goods from a trailer is also possible according to the present disclosure. Thus, according to an embodiment, it may be provided that the ECAS detects for example that a person has driven onto the trailer with a lift truck or a forklift, that is, that the determined mass on the loading area has initially risen as a result, only to drop abruptly because the forklift drives off the trailer with a load. According to the present disclosure, a before-after comparison may be provided for this purpose, which can be provided in a defined interval or dynamically, that is, in particular as a function of the measurement, for example when the mass increase and mass decrease are detected. In this way, the pressure curve across the various air-suspension bellows can also be evaluated. Thus, when the driver boards the vehicle with a forklift, there will be a higher pressure value in the bellows on the last axle of the vehicle than on the first.

The further the driver drives in, the further the pressure in the bellows shifts forward. By evaluating this pressure curve, loading or unloading of the vehicle at a specific position can also be detected.

The network for wireless signal transmission can advantageously be a depot network, in particular a WLAN or WiFi, which is often provided at such depots. Alternatively, the signals can also be transmitted via corresponding mobile radio interfaces.

BRIEF DESCRIPTION OF THE DRAWINGS

The invention will now be described with reference to the drawings wherein:

FIGS. 3 to 7 show flow diagrams of methods according to the present disclosure.

DESCRIPTION OF THE PREFERRED EMBODIMENTS

Figure 1:
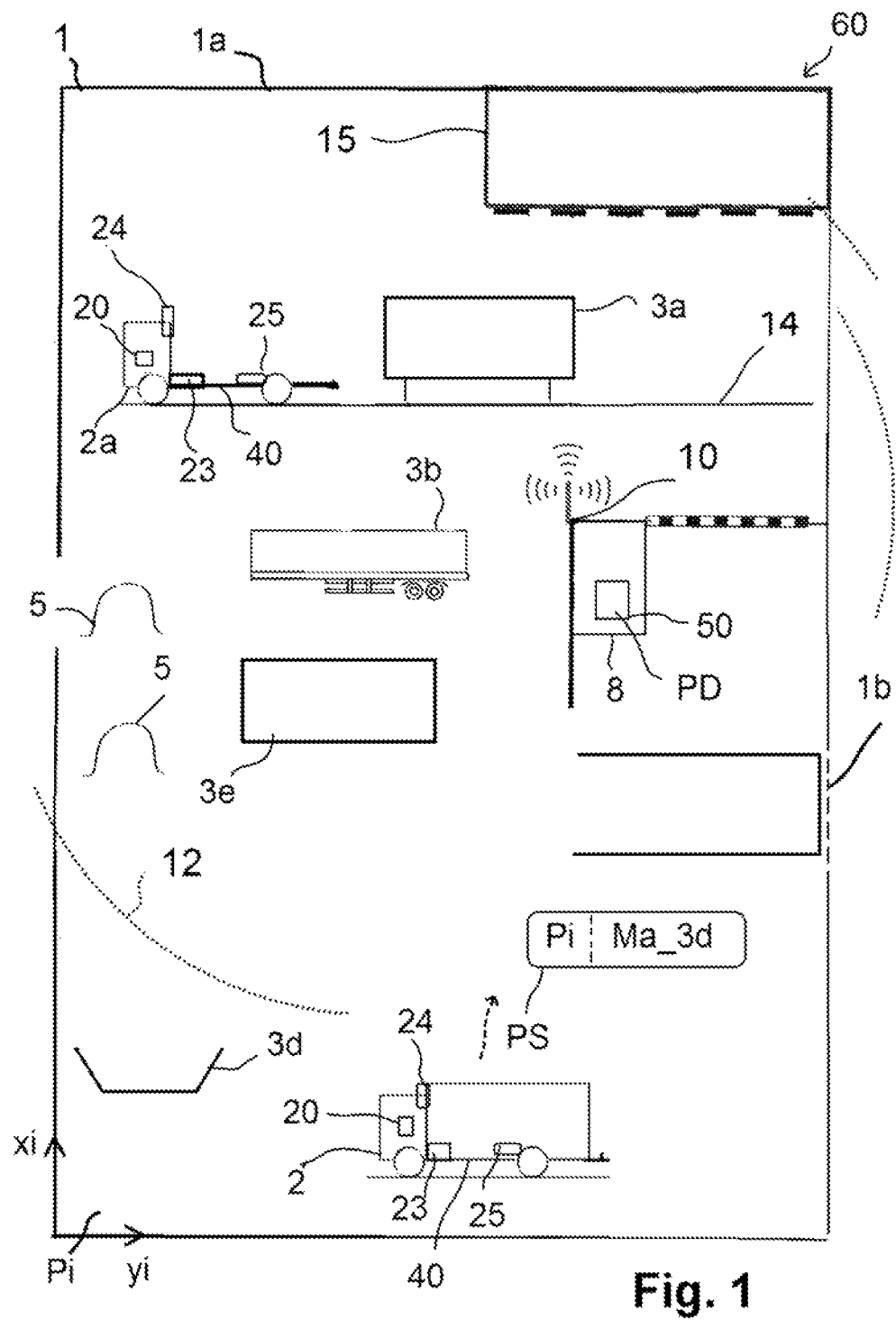
FIG. 1 shows a depot with vehicle combinations and mobile, interchangeable transport units at various positions.
Figure 2:
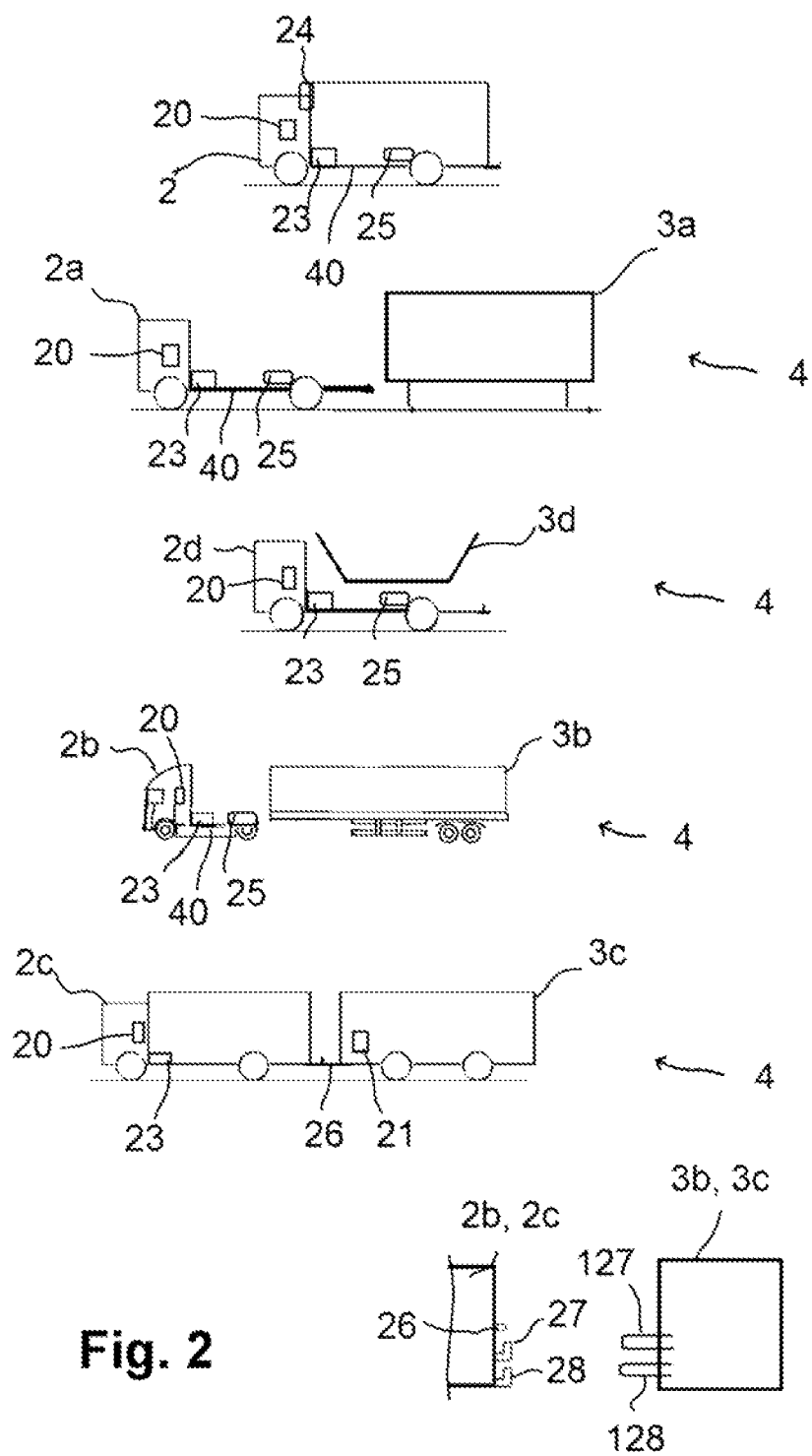
FIG. 2 shows various vehicle combinations and load carriers.

A depot 1 shown in FIG. 1 constitutes an area that is spatially delimited by a boundary 1a, and that is accessible from the outside via an access road 1b. The depot 1 can be described by a two-dimensional position data system for uniquely identifying positions Pi. Various vehicles 2 and mobile, interchangeable load carriers 3 are provided at the depot 1. Vehicles 2 shown in FIGS. 1 and 2 include for example a carrier vehicle 2a for a swap body 3a and, in FIG. 2, a semi-trailer tractor unit 2b for a semi-trailer 3b, as well as a towing vehicle 2c for a drawbar trailer 3c and a commercial vehicle 2d for accommodating a container 3d.

The swap body 3a, the semi-trailer 3b, the drawbar trailer 3c, and the container 3d thus constitute different mobile, interchangeable load carriers 3 (see FIG. 2) that serve to transport cargo and that can be moved to various positions Pi at the depot 1. A vehicle 2 including one or several load carriers 3 forms a vehicle-transport combination 4.

At the depot 1, there are also several bulk material offloading points 5, for example for concrete and gravel as building materials, or for disposal, for example as building rubble offloading points. Finally, a communication center 8 is provided in or at the depot 1, which, according to this embodiment, is equipped with or connected to a WLAN transceiver unit 10, for forming a depot network 12 for wireless data transmission.

At the depot 1, there can additionally be driveways 14 or roads for the individual vehicles 2 or vehicle-transport combinations 4, but this is not necessary. Furthermore, buildings 15 are generally provided for example with loading and unloading stations, for example ramps, which are approached by the vehicle-transport combinations 4 to be loaded or unloaded.

The various positions Pi of at least the various load carriers 3, advantageously also of the various vehicles 2, at the depot 1, are stored in a constantly updated position file PD, which is advantageously connected to, that is, managed by, the communication center 8, for example in a memory unit 50 provided in the communication center 8. Here, the positions Pi can be stored for example according to a two-dimensional coordinate system, that is, as (xi, yi), as indicated in FIG. 1. To update the position data Pi, position notification signals PS are formed by the vehicles 2 for certain notification events M, respectively including the notification event M, that is, in particular an offloading operation Ma or an accommodation operation Mb, and furthermore the relevant position data Pi, that is, the position notification signals PS have at least the structure (Pi, M), wherein the notification event M may be formed for example as Ma_3d, that is, an offloading operation Ma of a container 3d.

Thus, a position notification signal PS is formed when a vehicle 2 accommodates a load carrier 3, that is, there is an accommodation operation Mb, and when the load carrier 3 is later offloaded at another position Pi. The last reported operation is thus stored in the PD position file.

The position notification signals PS are transmitted wirelessly from the respective vehicle 2, for example via the depot network 12 and the WLAN transceiver device 10, to the communication center 8, so that they are stored in the position file PD, that is, in particular previously stored data are updated. If such WLAN access does not exist or is not advantageous, a different wireless data transmission, for example via a mobile network, may also be used. The notification events M are advantageously dependent on the respective mobile, interchangeable load carrier 3. In principle, such notification events M are to be detected in which a current position Pi is changed, for example a load carrier 3 is moved away from its position or is emptied or loaded; thus, advantageously, a start time of an emptying or loading is reported, preferably also an end time. Furthermore, it is reported when the load carrier 3 is again parked in its new position Pi at the depot 1 after a trip with the respective vehicle 2.

Information from an ECAS (electronically controlled air suspension) system 23, that is, measurement signals from the ECAS system 23, are used to detect a notification event M. Here, the time sequence of the change in lifting height $\Delta h$ of an air suspension device 25 and/or a change in air pressure $\Delta p$ of the air pressure of the air suspension device 25, that is, an increase or a decrease in the air pressure, is determined in order to detect a notification event. Thus, the parking/loading can be determined via the sequence of operations and/or via the pressure change in the ECAS system 23, or via both for plausibility checking.

Figure 3:
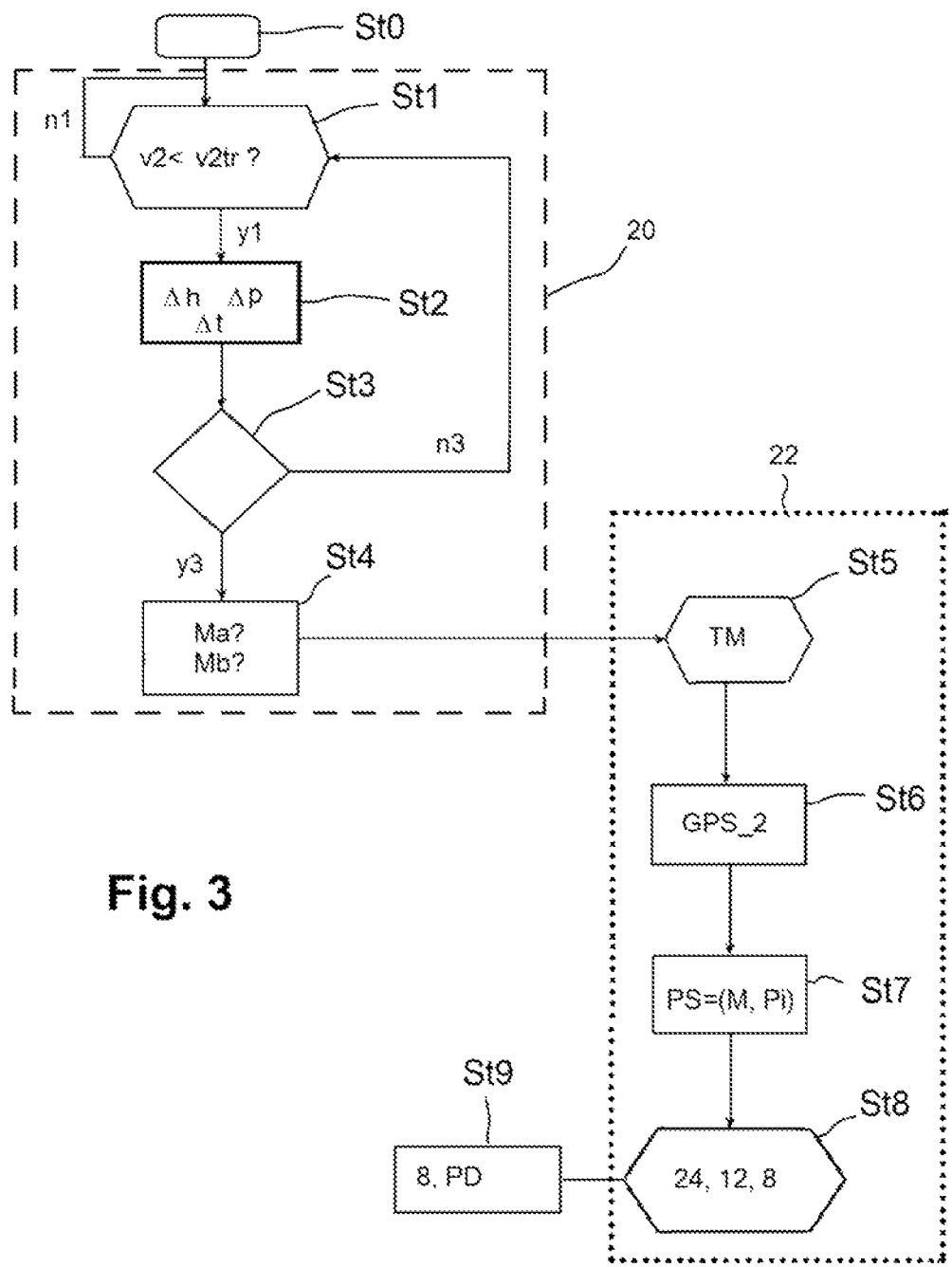

FIG. 3 shows a flowchart of a method for detecting the position of a swap body 3a (swap container), including the following steps:

After the start in step St0, the current vehicle speed v2 is detected in step St1, for example via the CAN bus according to the speedometer speed, or from the ABS control unit as ABS reference speed, or directly from the wheel speeds n transmitted via the CAN bus. The vehicle speed v2 is compared with a limit vehicle speed v2tr; that is, if the vehicle speed falls below the limit vehicle speed v2tr, the vehicle 2 is assumed to be at a standstill 65. If this is the case, current measurement signals of a change in lifting height Dh of the air suspension, that is, of one or several air cushions of the air-suspended axles of the vehicle 2, and/or a change Dp in the air pressure of the air suspension device 25, that is, of the pneumatic air cushions of the axles of the vehicle 2, are subsequently determined from the ECAS system 23 in accordance with the branch y1 in step St2. These changes can take place for example over a measurement period Dt of a few seconds in each case, that is, a difference quotient Dp/Dt or Dh/Dt of the measurements or, correspondingly, a time derivative dp/dt or dh/dt of the measurement signal, that is, of the pressure or level height, is thus determined in order to detect a change in lifting height Dh and/or a change in air pressure Dp.

In the subsequent decision step St3, the measured values $\Delta h$ and $\Delta p$ or $\Delta h/\Delta t$ and $\Delta p/\Delta t$ acquired in step St2 are then evaluated, that is, compared with limit values $\Delta h\_tr$ and $\Delta p\_tr$, to distinguish them from noise. If the measured values are greater than these limit values and thus a change is detected, an offloading operation Ma or an accommodation operation Mb is subsequently detected in step St4 according to the branch y3, whereupon a notification message TM is output in step St5 to transmit a position notification signal PS from the vehicle 2 to the communication center 8 via the depot network 12. According to an embodiment, steps St1 to St5 can be carried out in the EBS control unit 20 of the vehicle 2.

Thus, in step St5, for example the EBS control device 20 outputs a notification message TM to another unit, preferably a telematics control device 22 of the vehicle 2, which then forms the position notification signal PS in steps St6 and St7.

For this purpose, the telematics control device 22 records a current GNSS position GNSS_2 in step St6,
in step St7, the telematics control device 22 forms the position notification signal PS with the entries (notification event M; position data Pi), and in step St8, the position notification signal PS thus formed is transmitted to the communication center 8 via the vehicle WLAN interface 24 and the wireless depot network 12 (WLAN or WiFi),
which then stores the position data Pi in a current position file PD, that is, constantly updates the position file PD, in step St9.

The position file PD can contain further information about the load and load carrier if the information has been entered for example in advance in the system, that is, in particular by the user/driver or automatically by recognition devices.

According to an alternative embodiment to this, the swap body can also be accommodated on a trailer, for example a drawbar trailer 3c; furthermore, another type of trailer already described may also be provided that includes a trailer EBS (TEBS), so that steps St1 to St5 or part of these steps can be carried out in a TEBS control device 21. Then, the TEBS control device 21, when performing these steps or part of these steps, can subsequently also form the position notification signal PS itself and generate the notification message TM in steps St6 and St7.

FIG. 4 shows the "accommodate swap body" operation in greater detail, including the following steps:

In step St4-1, information about the mass m and, if applicable, about the load, is extracted from the ECAS. In step St4-2, the chassis 40 is released via the ECAS 23, that is, compressed air is released by actuating the pneumatic air suspensions 25, thereby lowering the level.

In step St4-3, the reverse gear is then engaged, which can be determined via a corresponding gear selection sensor. Advantageously, the actual reverse motion is also determined in particular via the wheel speeds n and a gear selection signal that is available in the EBS and TEBS, wherein in principle, the reverse motion can also be determined from a transmission speed and the gear selection signal.

Thus, the vehicle 2a is moved beneath the swap body 3a, whereupon the chassis 40 is raised again in accordance with step St4-4 via corresponding actuation of the pneumatic air suspension device 25 via the ECAS 23, wherein it can be assumed as a further criterion that the chassis 40 also remains at this level for a defined period of time, that is, the setting operation is terminated and is set for subsequent transport of the swap body 3a, that is, the swap body 3a has been raised as a result.

According to step St4-5, the vehicle-transport combination 4 is then detected, which here thus constitutes a loaded vehicle 2, for example by engaging the forward gear and/or increasing the wheel speed n, since the loaded vehicle 2 can also start in reverse.

Thus, in step St4-5, if the conditions are met, the completion of the vehicle-transport combination 4 is detected.

According to step St4-6, information about the mass m of the cargo is then determined from the ECAS 23, whereupon in step St4-7, the output of the notification message TM is then carried out according to step St5 of FIG. 3, that is, the notification message TM is output to the telematics control device 22, which then forms the position notification signal PS in steps St6 to St8 of FIG. 3 and outputs it to the communication center 8.

FIG. 5 shows a method corresponding to FIG. 4 for determining the "offload swap body" operation, including the following steps:

St5-1 to St5-2 corresponding to steps St4-1, St4-2 of FIG. 4;

Step St5-3 basically corresponds to St4-3, wherein, however, it is determined here whether the forward gear is engaged;

Step St5-4 corresponds to step St4-4;

Steps St5-6 and St5-7 correspond to the corresponding steps St4-6, St4-7 in FIG. 4.

Thus, the accommodation or loading of a swap body 3a can basically be detected by the fact that swap bodies 3a are removed backwards, since the vehicle 2a drives backwards beneath the swap body 3a and, correspondingly, conversely, after uncoupling or offloading the swap body 3a, the vehicle 2a drives away forwards beneath the swap body 3a.

FIG. 6 shows a flowchart of the detection of the "couple trailer/semi-trailer" operation:

In step St6-1, a data link 26 is established between the EBS control device 20 of the vehicle 2 and the TEBS control device 21 of the trailer 3b, 3c.

According to the above examples, trailers are in particular semi-trailers 3b, drawbar trailers 3c, and/or turntable trailers.

According to step St6-2, the brake supply line 127 of the trailer 3b, 3c is connected to the red coupling head 27 of the towing vehicle 2b, 2c;

furthermore, the brake control line 128 of the trailer 3b, 3c is connected to the yellow coupling head 28 of the towing vehicle 2b, 2c.

These pneumatic connections can be determined in step St6-2, for example by pressure sensors of the towing vehicle 2b, 2c and/or the trailer 3b, 3c.

Thus, the electrical and pneumatic connections are formed between both vehicles 2, 3. Subsequently, in step St6-3, it is checked whether the parking brake of the towing vehicle and/or the trailer vehicle is released. In addition or alternatively to this, it is checked whether a movement of the tractor-trailer combination 4 can already be determined by determining wheel speeds n of the towing vehicle and/or the trailer vehicle, that is, n>0.

According to step St6-4, the notification message TM is again output from the EBS control device 20 to the telematics control device 22 below, as described above in steps St6, St7 in FIG. 3, in order to form a position notification signal PS, which thus contains, as a notification event, an accommodation event Mb that the trailer 3b, 3c has been withdrawn, that is, has been removed from its current stored position Pi.

Accordingly, the determination of the "uncouple trailer/semi-trailer" operation is described below with reference to FIG. 7.

In step St7-1, it is checked whether the parking brake of the trailer 3b, 3c is engaged.

In step St7-2, it is determined whether the brake control line 128 of the trailer 3b, 3c has been decoupled or disconnected from the yellow coupling head 28 of the vehicle 2b, 2c and whether the supply line 127 of the trailer 3b, 3c has been decoupled or disconnected from the red coupling head 27 of the towing vehicle 2b, 2c.

Thus, the pneumatic connections are released. In contrast to the methods in FIG. 6, it may be provided that it is not checked whether the data link between the EBS control unit 20 and the TEBS control unit 21 has been changed, since the parked trailer 3c or semi-trailer 3b can in principle also continue to be connected to the towing vehicle 2 in terms of information technology while the pneumatic lines are disconnected.

Subsequently, in step St7-3, the notification message TM for parking the trailer 3b, 3c is output by the EBS control device 20, whereupon, again according to FIG. 3, the position notification signal PS is formed in steps St6, St7 and subsequently output in step St8.

Thus, in each case, the operation of moving a trailer 3b, 3c, that is, removing it from the current position Pi, and then moving and parking the trailer 3b, 3c at the new position Pi, can be automatically detected and transmitted to the communication center 8.

The communication center 8 can basically note if a trailer 3 has been removed from the current position Pi according to the available data, but no parking operation has been determined yet; such trailers 3 can be identified with a data suffix in this case. On the one hand, trailers 3 currently being transported at the depot 1 can be identified, in particular directly by entering them on a map; furthermore, trailers 3 located outside the depot can also be detected, wherein GNSS coordinates can be transmitted here.

Furthermore, it is also possible that the communication center 8 manages existing parking spaces, and thus also notes the vacancy of a parking space; thus, upon request of a towing vehicle 2, it can be communicated where there is a vacant parking space.

If a wireless connection to the communication center 8 cannot be established, it may be provided that the position data Pi is recorded and stored in a memory 50, and after a wireless connection is established, the stored position data Pi is then transmitted to the communication center 8, whereupon the stored data can then be deleted.

Furthermore, according to the present disclosure, it may be provided that a position file is also transmitted when the telematics unit is shut down and/or switched off.

It is understood that the foregoing description is that of the preferred embodiments of the invention and that various changes and modifications may be made thereto without departing from the spirit and scope of the invention as defined in the appended claims.

LIST OF REFERENCE CHARACTERS (PART OF THE DESCRIPTION)

1 Detection area, in particular depot
1a External demarcation
1b Access road
2 Vehicles, for example:
2a Carrier vehicle for a swap body 3a,
2b Tractor unit of a semi-trailer truck
2c Towing vehicle of drawbar combination
2d Commercial vehicle for accommodating a transport container
3 Mobile, interchangeable load carrier
3a Swap body
3b Semi-trailer
3c Drawbar trailer
3d Transport container, for example construction waste container
3e ISO container or overseas container, as examples of transport containers.
4 Vehicle-transport combination, consisting of a vehicle 2 and a mobile, interchangeable load carrier 3
5 Bulk material offloading point
8 Communication center
10 Transceiver unit of the wireless network, in particular WLAN
12 Depot network, for example WLAN
14 Driveways at depot 1
15 Building
20 EBS control unit of the commercial vehicle 2
21 TEBS control unit of the trailer
22 Telematics control unit of the commercial vehicle 2
23 ECAS system
24 Vehicle-WLAN interface of the commercial vehicle 2
25 Air suspension system, level control system of the commercial vehicle 2
26 Data link between the EBS control unit 20 of the vehicle 2 and the TEBS control unit 21 of the trailer 3b, 3c
27 Red coupling head of the towing vehicle 2b, 2c,
28 Yellow coupling head of the towing vehicle 2b, 2c
40 Chassis of the commercial vehicle 2
50 Data memory
127 Brake supply line of the trailer 3b, 3c, for connection to the red coupling head 27 of the towing vehicle 2b, 2c
128 Brake control line of the trailer 3b, 3c, for connection to the yellow coupling head 28 of the towing vehicle 2b, 2c
M Notification event
Ma Offloading operation, offloading or uncoupling a load carrier 3
Mb Accommodation operation, accommodation or coupling of a load carrier
Pi Position data, Pi=(xi, yi)
PD Position file
PS Position notification signal, PS=(notification event M; position data Pi),
S55 Measurement signals of the ECAS system 55
TM Notification message
Δh Change in lifting height, change in level of the trolley 40
Δp Change in air pressure in the air suspension system
Δt Measurement period
134 Control signal for chassis release
135 Forward gear
136 Reverse gear
138 Chassis level

What is claimed is:

1. A method for detecting a position of a mobile, interchangeable load carrier that is movable by a commercial vehicle in a delimited detection area in which the mobile, interchangeable load carrier is moved by the commercial vehicle, the method comprising:
   determining, by the commercial vehicle, at least one of an accommodation operation and an offloading operation of the at least one mobile, interchangeable load carrier in the detection area as a notification event;
   determining, by the commercial vehicle, position data for identifying the position of the notification event in the detection area;
   forming, by the commercial vehicle, a position notification signal from the determined notification event and the determined position data;
   transmitting the position notification signal to a communication center via a wireless network;
   determining, in the communication center, current position data of the mobile, interchangeable load carrier from the position notification signal, wherein the current position data is stored in a data memory and continuously updated;
   wherein in order to determine the notification event, it is first determined from vehicle-internal data whether a standstill of the commercial vehicle exists, and
   if a standstill exists, it is determined from temporally successive measurement signals whether the notification event is the offloading operation or the accommodation operation,
   if the notification event is detected, a notification message is formed by an EBS control device of an electronic braking system of the commercial vehicle and is output to a telematics control unit of the commercial vehicle via a vehicle-internal data bus,
   the current position data are subsequently determined by the telematics control device, and,
   subsequently, the position notification signal is formed from the position data and the notification event and is transmitted to the communication center via the wireless network.

2. The method of claim 1, wherein the mobile, interchangeable load carrier is a swap body for accommodation on the commercial vehicle, a semi-trailer for accommodation on the commercial vehicle configured as a semi-trailer tractor unit, a drawbar trailer for attachment to a commercial vehicle configured as a drawbar towing vehicle, a turntable drawbar for attachment to a commercial vehicle configured as a drawbar towing vehicle, or a container to be accommodated by a commercial vehicle configured as a container vehicle.

3. The method of claim 1, wherein the at least one of the accommodation operation and the offloading operation is a predetermined, defined operation carried out via technical coupling means.

4. The method of claim 1, wherein the load carrier is one of a plurality of load carriers and the commercial vehicle is one of a plurality of commercial vehicles provided in the detection area.

5. The method of claim 4, wherein the detection area is one of a depot having an external demarcation and at least one access road for the commercial vehicles, a rest stop, a building site, and a port area.

6. The method of claim 1, wherein via the commercial vehicle, the mobile, interchangeable load carrier is at least one of: delivered to the detection area, temporarily parked, moved on the delimited area, and transported away from the detection area by the commercial vehicle.

7. The method of claim 1, wherein the wireless network is a depot WLAN for protocol-based, non-open data transmission.

8. The method of claim 4, wherein the wireless network is a depot WLAN for protocol-based, non-open data transmission for only the plurality of mobile, interchangeable load carriers and the plurality of commercial vehicles.

9. The method of claim 1, wherein the at least one of the offloading operation and the accommodation operation of the load carrier is determined by:
   recording of measurement signals of a pneumatic air suspension system of the commercial vehicle;
   determining from the measurement signals whether a change exists, said change being at least one of a temporal change in a lifting height of an air suspension device and a pressure change in air pressure in the air suspension device of the commercial vehicle; and,
   if at least one of the temporal change in the lifting height and the change in air pressure of the air suspension device is detected,
   deciding whether said change is to be evaluated as the at least one of the offloading operation and the accommodation operation, and
   if the at least one of the offloading operation and the accommodation operation is determined, subsequently forming the notification message.

10. The method of claim 9, wherein the determination of whether the temporal change in lifting height exists is carried out via comparison of the measurement signals with pre-stored data and evaluation of a difference between the measurement signals and the pre-stored data.

11. The method of claim 1, wherein the mobile, interchangeable, load carrier is a swap body; and, wherein the accommodation operation of the swap body is determined via the following steps:
   determining a current mass of a load from a pneumatic air suspension system;
   lowering or releasing a chassis of the commercial vehicle by at least one of detecting a control signal for chassis release and detecting level sinking;
   determining an engagement operation of a reverse gear from a gear shift signal or determining reverse travel from wheel speed signals;
   determining a raising of the chassis or a remaining at a predetermined chassis level over a measurement time period, from level adjustment control signals or level height measurement signals;
   subsequently determining at least one of an engagement of a forward gear from a gear shift signal and a forward travel from a wheel speed signal;
   subsequently determining a mass of the load or of the commercial vehicle having a load that is higher than an initially determined mass of the load or of the commercial vehicle without the load; and,
   wherein the accommodation operation is subsequently reported.

12. The method of claim 11, wherein the accommodation operation is subsequently reported as a notification message for subsequent formation of the position notification signal with current position data.

13. The method of claim 11, wherein the current position data are determined at least one of during or after the accommodation operation, when the gear shift signal is generated, and when the forward gear or the reverse gear is engaged.

14. The method of claim 1, wherein the mobile, interchangeable load carrier is a swap body; and, wherein the offloading operation of the swap body is determined via the following steps:
   determining a current mass of a load from a pneumatic air suspension system;
   lowering or releasing a chassis of the commercial vehicle, by detecting at least one of a control signal for chassis release and a level lowering;
   determining an engagement operation of a forward gear from a gear shift signal or determining forward travel from wheel speed signals;
   determining a raising of the chassis or a remaining at the predetermined chassis level over a measurement time period, from level adjustment control signals or level height measurement signals;
   subsequently determining at least one of engagement of a forward gear from a gear shift signal and a forward travel from a wheel speed signal;
   determining a mass of the load that is lower than the initially determined mass of the load;
   wherein the offloading operation is subsequently reported.

15. The method of claim 12, wherein the determination of the total mass of the commercial vehicle with the swap body is performed after the chassis is raised or remains at the predetermined chassis level.

16. The method of claim 1, wherein the mobile, interchangeable load carrier is a trailer, wherein the trailer is a semi-trailer for accommodation on the commercial vehicle configured as a semi-trailer tractor unit or a drawbar trailer for attachment to the commercial vehicle configured as a drawbar towing vehicle, wherein for detecting the notification event of a coupling operation of the semi-trailer or drawbar trailer comprising its own trailer braking system, the following steps are provided:
   determining the establishment of a data link between an electronic braking system of the commercial vehicle and the trailer braking system of the trailer;
   determining a connection of a pneumatic trailer brake line to a brake line coupling of the commercial vehicle, and connecting a pneumatic trailer supply line to a pneumatic towing vehicle supply line coupling of the commercial vehicle;
   subsequently at least one of releasing a parking brake of the commercial vehicle and determining travel of the commercial vehicle by evaluating wheel speed signals;
   wherein the accommodation operation is subsequently reported.

17. The method of claim 16, wherein the connection of the pneumatic trailer brake line to the brake line coupling is determined by determining pressure signals in at least one of the commercial vehicle, a trailer vehicle, and the trailer.

18. The method of claim 1, wherein the determination of the offloading operation of a trailer vehicle is determined via the following steps:
   determining the engagement of a parking brake of the trailer;
   subsequently determining a disconnection of a pneumatic trailer brake line from a brake line coupling of the commercial vehicle, and disconnecting a pneumatic trailer supply line from a pneumatic towing vehicle supply line coupling of the commercial vehicle,
   and/or detecting an interruption of a data link between a towing vehicle electronic braking system and the trailer,
   wherein the offloading operation is subsequently reported.

19. The method of claim 4, wherein the method is also additionally carried out spatially beyond the detection area, and accommodation operations and offloading operations of the plurality of mobile, interchangeable load carriers are determined by the plurality of commercial vehicles as notification events, the position data for identifying the position in a global navigation satellite system are determined, the position notification signals are formed and transmitted to the communication center via a further wireless network wherein, in the communication center, the current position data of the at least one load carrier are determined from the received position notification signals and are stored and continuously updated in the data memory.

20. The method of claim 1, wherein, in the case that no wireless connection to the communication center can be established, the position data are recorded and stored, and after establishing a wireless connection, the stored position data are transmitted to the communication center.

21. A fleet management system for a delimited detection area for carrying out a method including:
   determining, by a commercial vehicle, at least one of an accommodation operation and an offloading operation of at least one mobile, interchangeable load carrier in the delimited detection area as a notification event;
   determining, by the commercial vehicle, position data for identifying a position of the notification event in the detection area;
   forming, by the commercial vehicle, a position notification signal from the determined notification event and the determined position data;
   transmitting the position notification signal to a communication center via a wireless network;
   determining, in the communication center, current position data of the mobile, interchangeable load carrier from the position notification signal, wherein the current position data is stored in a data memory and continuously updated;
   wherein in order to determine the notification event, it is first determined from vehicle-internal data whether a standstill of the commercial vehicle exists, and
   if a standstill exists, it is determined from temporally successive measurement signals whether the notification event is the offloading operation or the accommodation operation,
   if the notification event is detected, a notification message is formed by an EBS control device of an electronic braking system of the commercial vehicle and is output to a telematics control unit of the commercial vehicle via a vehicle-internal data bus,
   the current position data are subsequently determined by the telematics control device, and,
   subsequently, the position notification signal is formed from the position data and the notification event and is transmitted to the communication center via the wireless network;
   wherein the fleet management system comprises:
   a connection to at least one commercial vehicle;
   a plurality of load carriers that are movable by the at least one commercial vehicle in the delimited detection area;
   said communication center having a transceiver for a depot network for communication with the at least one commercial vehicle; and,
   said communication center including the data memory for storing the current position data of the plurality of load carriers.

22. The fleet management system of claim 21, wherein the delimited detection area is a depot.

23. A method for detecting a position of a mobile, interchangeable load carrier that is movable by a commercial vehicle in a delimited detection area in which the mobile, interchangeable load carrier is moved by the commercial vehicle, the method comprising:
   determining, by the commercial vehicle, at least one of an accommodation operation and an offloading operation of the at least one mobile, interchangeable load carrier in the detection area as a notification event;
   determining, by the commercial vehicle, position data for identifying the position of the notification event in the detection area via a global positioning system;
   forming, by the commercial vehicle, a position notification signal from the determined notification event and the determined position data;
   transmitting the position notification signal to a communication center via a wireless network;
   determining, in the communication center, current position data of the mobile, interchangeable load carrier from the position notification signal, wherein the current position data is stored in a data memory and continuously updated;
   wherein the at least one of the offloading operation and the accommodation operation of the load carrier is determined by:
   recording of measurement signals of a pneumatic air suspension system of the commercial vehicle;
   determining from the measurement signals whether a change exists, said change being at least one of a temporal change in a lifting height of an air suspension device and a pressure change in air pressure in the air suspension device of the commercial vehicle; and,
   if at least one of the temporal change in the lifting height and the change in air pressure of the air suspension device is detected, deciding whether said change is to be evaluated as the at least one of the offloading operation and the accommodation operation, and if the at least one of the offloading operation and the accommodation operation is determined, subsequently forming the notification message.

* * * * *